United States Patent
Elshafie et al.

(10) Patent No.: US 12,096,443 B2
(45) Date of Patent: Sep. 17, 2024

(54) SIGNALING FOR 1024 QUADRATURE AMPLITUDE MODULATION TABLE INDICATION AND CONFIGURATION

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/164,606

(22) Filed: Feb. 1, 2021

(65) Prior Publication Data
US 2022/0248377 A1    Aug. 4, 2022

(51) Int. Cl.
*H04W 4/00* (2018.01)
*H04L 1/00* (2006.01)
(Continued)

(52) U.S. Cl.
CPC ........... *H04W 72/23* (2023.01); *H04L 1/0004* (2013.01); *H04L 1/001* (2013.01); *H04L 1/0013* (2013.01); *H04L 27/38* (2013.01)

(58) Field of Classification Search
CPC .... H04W 72/042; H04L 1/0004; H04L 1/001; H04L 1/0013; H04L 27/38; H04L 1/0026;
(Continued)

(56) References Cited

U.S. PATENT DOCUMENTS

2019/0190644 A1*   6/2019   Ugurlu ................ H04L 27/2607
2019/0215095 A1*   7/2019   Park .................... H04W 72/0453
(Continued)

FOREIGN PATENT DOCUMENTS

| EP | 3122141 A1 | 1/2017 |
|---|---|---|
| EP | 3512138 A1 | 7/2019 |

OTHER PUBLICATIONS

3GPP TSG-RAN WG1 Meeting #103-e, Online, Oct. 26-Nov. 13, 2020, Tdoc R1-2009209 (Year: 2020).*
(Continued)

*Primary Examiner* — Atique Ahmed
(74) *Attorney, Agent, or Firm* — Guang Yu Zhang; Harrity & Harrity, LLP

(57) ABSTRACT

Various aspects of the present disclosure generally relate to wireless communication. In some aspects, a user equipment (UE) may receive a downlink control information transmission comprising a resource allocation for downlink traffic and at least one dedicated table bit that indicates whether the UE is to use, to decode the downlink traffic, a first modulation order and a first target code rate corresponding to a first modulation and coding scheme (MCS) table or a second modulation order and a second target code rate corresponding to a second MCS table (a 1024 quadrature amplitude modulation table). The UE may decode the downlink traffic according to the first modulation order and the first target code rate or the second modulation order and the second target code rate based at least in part on at least one value of the at least one dedicated table bit. Numerous other aspects are described.

30 Claims, 7 Drawing Sheets

(51) Int. Cl.
  *H04L 27/38* (2006.01)
  *H04W 72/23* (2023.01)
(58) Field of Classification Search
  CPC ....... H04L 1/0061; H04L 1/16; H04L 1/1867; H04L 1/0011; H04L 1/0016; H04L 1/0025; H04L 1/0005
  See application file for complete search history.

(56) References Cited

U.S. PATENT DOCUMENTS

| | | | |
|---|---|---|---|
| 2019/0261399 A1* | 8/2019 | Munier | H04L 5/0051 |
| 2020/0078909 A1 | 3/2020 | Park et al. | |
| 2020/0245166 A1* | 7/2020 | Kwak | H04B 7/024 |
| 2020/0287654 A1* | 9/2020 | Xi | H04L 5/0055 |
| 2020/0413425 A1* | 12/2020 | Lin | H04W 72/21 |
| 2021/0013991 A1* | 1/2021 | Park | H04W 72/23 |
| 2021/0037478 A1 | 2/2021 | Yang et al. | |
| 2021/0058947 A1 | 2/2021 | Lin et al. | |
| 2021/0068115 A1 | 3/2021 | Gotoh et al. | |
| 2021/0144623 A1 | 5/2021 | Höglund et al. | |
| 2021/0307055 A1* | 9/2021 | Tsai | H04W 76/38 |
| 2021/0320776 A1* | 10/2021 | Aiba | H04L 1/0061 |
| 2021/0344399 A1* | 11/2021 | Levy | H04L 5/0053 |
| 2021/0345305 A1 | 11/2021 | Takeda et al. | |
| 2021/0345366 A1* | 11/2021 | Ying | H04W 72/0453 |
| 2022/0007403 A1 | 1/2022 | Li et al. | |
| 2022/0039068 A1 | 2/2022 | Hoglund et al. | |
| 2022/0053483 A1* | 2/2022 | Yoshioka | H04W 72/1268 |
| 2022/0279551 A1* | 9/2022 | Liu | H04W 72/0446 |
| 2022/0386361 A1* | 12/2022 | Takahashi | H04L 1/189 |

OTHER PUBLICATIONS

Broadcom Corporation: "CQI Table and Feedback Design for 256 QAM", 3GPP TSG-RAN WG1 Meeting #76bis, 3GPP Draft, R1-141565, CQI Design for 256QAM, 3rd Generation Partnership Project (3GPP), Mobile Competence Centre, 650, Route Des Lucioles, F-06921 Sophia-Antipolis Cedex, France, vol. RAN WG1. No. Shenzhen, China, Mar. 31, 2014-Apr. 4, 2014, 6 Pages, Mar. 30, 2014 (Mar. 30, 2014), XP050787232, Retrieved from the Internet: URL: http://www.3gpp.org/ftp/Meetings_3GPP_SYNC/RAN1/Docs/ [retrieved on Mar. 30, 2014] Sections 2-3, p. 1-p. 3.

Ericsson: "1024-QAM for NR DL", 3GPP TSG-RAN WG1 Meeting #103-e, 3GPP Draft, R1-2009209, 3rd Generation Partnership Project (3GPP), Mobile Competence Centre, 650, Route Des Lucioles, F-06921 Sophia-Antipolis Cedex, France, vol. RAN WG1. No. Online, Oct. 26, 2020-Nov. 13, 2020, pp. 1-7, Oct. 24, 2020 (Oct. 24, 2020), XP051946900, Retrieved from the Internet: URL: https://ftp.3gpp.org/tsg_ran/WG1_RL1/TSGR1_103-e/Docs/R1-2009209.zip R1-2009209 1024-QAM for NR DL.docx [retrieved on Oct. 24, 2020] Section 2, p. 1-p. 4.

International Search Report and Written Opinion—PCT/US2022/070266—ISA/EPO—May 6, 2022.

* cited by examiner

SIGNALING FOR 1024 QUADRATURE AMPLITUDE MODULATION TABLE INDICATION AND CONFIGURATION

FIELD OF THE DISCLOSURE

Aspects of the present disclosure generally relate to wireless communication and to techniques and apparatuses for signaling for 1024 quadrature amplitude modulation table indication and configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a downlink control information (DCI) transmission comprising a physical downlink shared channel resource allocation for downlink traffic, wherein the DCI transmission includes at least one dedicated table bit that indicates whether the UE is to use, to decode the downlink traffic, a first modulation order and a first target code rate corresponding to a first modulation and coding scheme (MCS) table or a second modulation order and a second target code rate corresponding to a second MCS table, wherein the second MCS table corresponds to 1024 quadrature amplitude modulation (QAM); and decoding the downlink traffic according to the first modulation order and the first target code rate or the second modulation order and the second target code rate based at least in part on at least one value of the at least one dedicated table bit.

In some aspects, a method of wireless communication performed by a base station includes transmitting a DCI transmission comprising a physical downlink shared channel resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table, wherein the second MCS table corresponds to 1024-QAM; and transmitting the downlink traffic according to the first modulation order and the first target code rate or the second modulation order and the second target code rate based at least in part on at least one value of the at least one dedicated table bit.

In some aspects, a UE for wireless communication includes a memory; and one or more processors coupled to the memory, the memory and the one or more processors configured to: receive a DCI transmission comprising a physical downlink shared channel resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table, wherein the second MCS table corresponds to 1024-QAM; and decode the downlink traffic according to the first modulation order and the first target code rate or the second modulation order and the second target code rate based at least in part on at least one value of the at least one dedicated table bit.

In some aspects, a base station for wireless communication includes a memory; and one or more processors coupled to the memory, the memory and the one or more processors configured to: transmit a DCI transmission comprising a physical downlink shared channel resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table, wherein the second MCS table corresponds to 1024-QAM; and transmit the downlink traffic according to the first modulation order and the first target code rate or the second modulation order and the second target code rate based at least in part on at least one value of the at least one dedicated table bit.

In some aspects, a non-transitory computer-readable medium storing a set of instructions for wireless communication includes one or more instructions that, when executed by one or more processors of a UE, cause the UE to: receive a DCI transmission comprising a physical downlink shared channel resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table, wherein the second MCS table corresponds to 1024-QAM; and decode the downlink traffic according to the first modulation order and the first target code rate or the second modulation order and the second target code rate based at least in part on at least one value of the at least one dedicated table bit.

In some aspects, a non-transitory computer-readable medium storing a set of instructions for wireless communication includes one or more instructions that, when executed by one or more processors of a base station, cause the base station to: transmit a DCI transmission comprising a physical downlink shared channel resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table, wherein the second MCS table corresponds to 1024-QAM; and transmit the downlink traffic according to the first modulation order and the first target code rate or the second modulation order and the second target code rate based at least in part on at least one value of the at least one dedicated table bit.

In some aspects, an apparatus for wireless communication includes means for receiving a DCI transmission comprising a physical downlink shared channel resource allocation for downlink traffic, wherein the DCI transmission includes at least one dedicated table bit that indicates whether the apparatus is to use, to decode the downlink traffic, a first modulation order and a first target code rate corresponding to a first MCS table or a second modulation order and a second target code rate corresponding to a second MCS table, wherein the second MCS table corresponds to 1024-QAM; and means for decoding the downlink traffic according to the first modulation order and the first target code rate or the second modulation order and the second target code rate based at least in part on at least one value of the at least one dedicated table bit.

In some aspects, an apparatus for wireless communication includes means for transmitting a DCI transmission comprising a physical downlink shared channel resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table, wherein the second MCS table corresponds to 1024-QAM; and means for transmitting the downlink traffic according to the first modulation order and the first target code rate or the second modulation order and the second target code rate based at least in part on at least one value of the at least one dedicated table bit.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
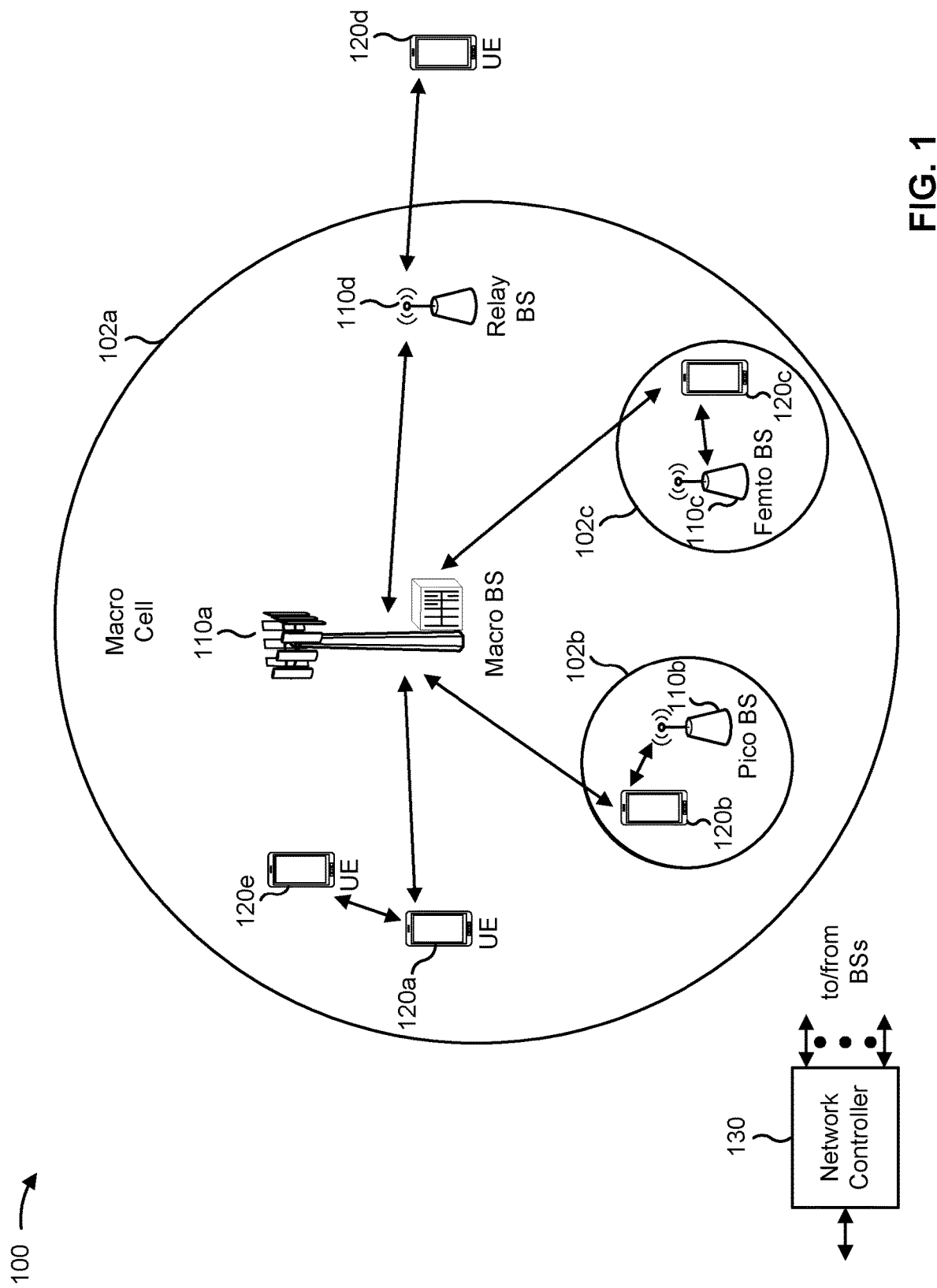
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
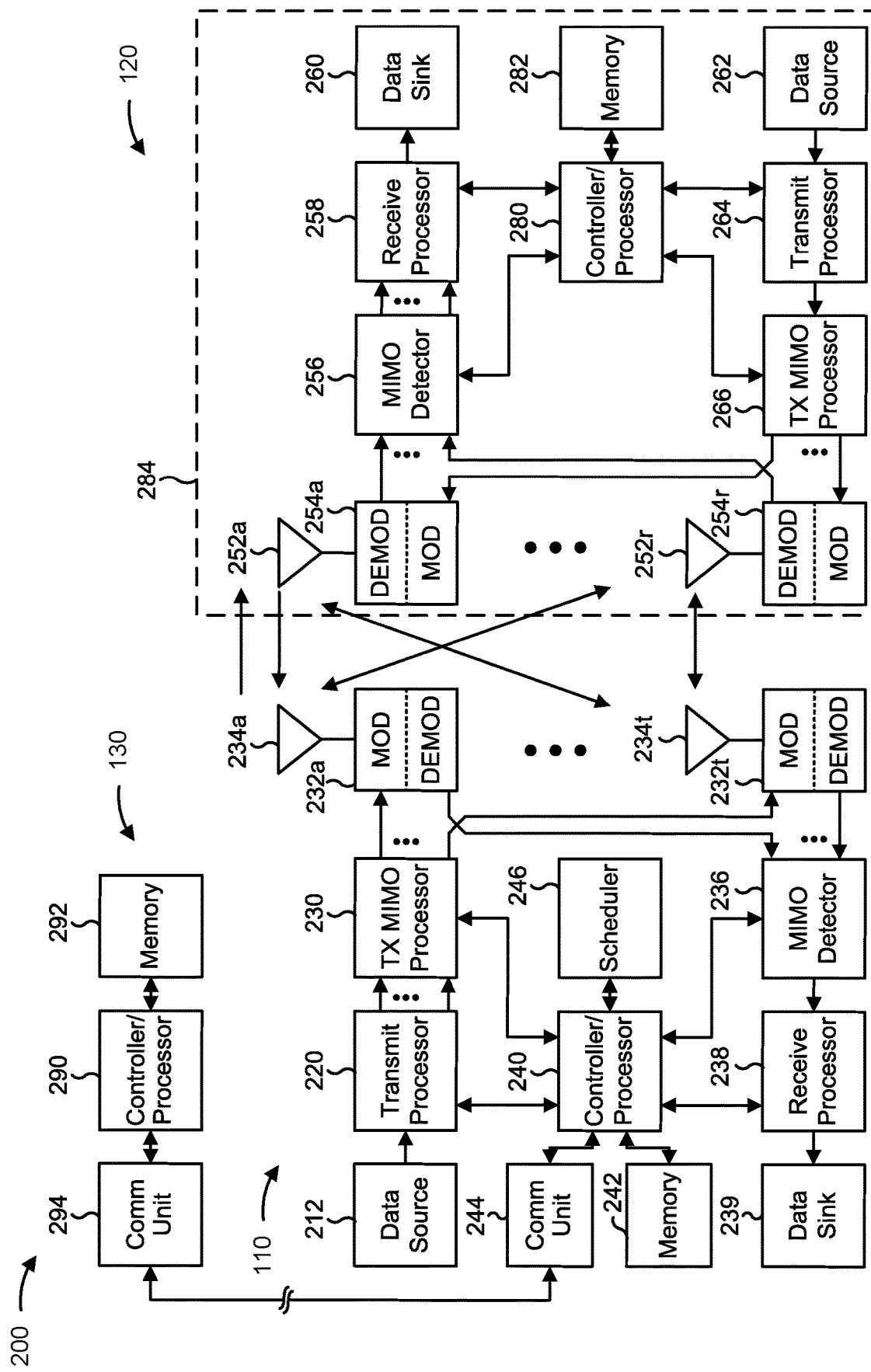
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-5.

Controller/processor 240 of base station 110, controller/processor 280 of UE 120, and/or any other component(s) of FIG. 2 may perform one or more techniques associated with signaling for 1024 quadrature amplitude modulation (QAM) table indication and configuration, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, UE 120 may include means for receiving a downlink control information (DCI) transmission comprising a physical downlink shared channel resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table, wherein the second MCS table corresponds to 1024-QAM, means for decoding the downlink traffic according to the first modulation order and the first target code rate or the second modulation order and the second target code rate based at least in part on at least one value of the at least one dedicated table bit, or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, or the like.

In some aspects, the means described above may include means for determining whether to use the first modulation order and the first target code rate or the second modulation order and the second target code rate based at least in part on a value of a single bit. In some aspects, the means described above may include means for determining whether to use the first modulation order and the first target code rate or the second modulation order and the second target code rate regardless of a radio network temporary identifier (RNTI). In some aspects, the means described above may include means for determining whether to use the first modulation order and the first target code rate or the second modulation order and the second target code rate based at least in part on the RNTI.

In some aspects, the means described above may include means for selecting the second MCS table based at least in part on a determination that the value of the table parameter corresponds to the second MCS table, that the UE is not configured with an MCS-cell-RNTI (MCS-C-RNTI), and that the DCI transmission comprises a DCI 1_2 format having a cyclic redundancy check (CRC) scrambled by a cell RNTI (C-RNTI). In some aspects, the means described above may include means for selecting the second MCS table based at least in part on a determination that the value of the table parameter corresponds to the second MCS table, that the UE is not configured with an MCS-C-RNTI, and that the DCI transmission comprises a DCI format other than DCI format 1_2 in a UE-specific search space having a CRC scrambled by a C-RNTI. In some aspects, the means described above may include means for selecting the second MCS table based at least in part on a determination that the value of the table parameter corresponds to the second MCS table, that the UE is configured with an MCS-C-RNTI 2 (MCS-C-RNTI2), and that the DCI transmission comprises a CRC scrambled by the MCS-C-RNTI2.

In some aspects, the means described above may include means for selecting the second MCS table based at least in part on a determination that the value of the table parameter corresponds to the second MCS table, that the UE is not configured with a semi-persistent scheduling (SPS) dedicated table parameter, and that the DCI transmission comprises a DCI format 1_2 having a CRC scrambled by a configured scheduling (CS)-RNTI or that SPS is activated by the DCI format 1_2 without a corresponding physical downlink control channel transmission (PDCCH). In some aspects, the means described above may include means for selecting the second MCS table based at least in part on a determination that the value of the table parameter corresponds to the second MCS table, that the UE is not configured with an SPS dedicated table parameter, and that the DCI transmission comprises a DCI format 1_1 having a CRC scrambled by a CS-RNTI or that SPS is activated by the DCI format 1_1 without a corresponding PDCCH.

In some aspects, the means described above may include means for transmitting a medium access control control element (MAC CE) to overwrite a radio resource control (RRC) configuration to enable one or more functionalities associated with the at least one dedicated table bit. In some aspects, the means described above may include means for receiving an SPS configuration that comprises a set of default MCS parameters associated with an MCS table corresponding to a lower QAM than an MCS table corresponding to a set of current MCS parameters. In some aspects, the means described above may include means for determining that a number of negative acknowledgements transmitted within a measurement window satisfies a threshold; and/or selecting the set of default MCS parameters based at least in part on determining that the number of negative acknowledgements satisfies the threshold.

In some aspects, the means described above may include means for receiving a group configuration that indicates an association between a group of SPS configurations and a set of MCS parameters, wherein the at least one dedicated table bit indicates the group of SPS configurations. In some aspects, the means described above may include means for transmitting a channel state information (C SI) report that indicates a suggested MCS table to be used in interpreting the CSI report. In some aspects, the means described above may include means for receiving an indication, based at least in part on the suggested MCS table, to use one or more MCS tables in computing a CQI.

In some aspects, base station 110 may include means for transmitting a DCI transmission comprising a physical downlink shared channel resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table, wherein the second MCS table corresponds to 1024-QAM, and/or means for transmitting the downlink traffic according to the first modulation order and the first target code rate or the second modulation order and the second target code rate based at least in part on at least one value of the at least one dedicated table bit. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, or the like.

In some aspects, the means described above may include means for transmitting an SPS configuration that comprises a set of default MCS parameters associated with an MCS table corresponding to a lower QAM than an MCS table corresponding to a set of current MCS parameters. In some aspects, the means described above may include means for transmitting a group configuration that indicates an association between a group of SPS configurations and a set of MCS parameters, wherein the at least one dedicated table bit indicates the group of SPS configurations.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A base station 110 and a UE 120 may communicate using a particular modulation order to encode traffic. For example, the modulation order may correspond to a modulation scheme (e.g., quadrature phase shift keying (QPSK) associated with modulation order 4, 16-quadrature amplitude modulation (16-QAM) associated with modulation order 6, 64-QAM associated with modulation order 8, and so on). A higher modulation order may provide a higher throughput but may require better signal to noise ratio (SNR) and/or better operating conditions than a lower modulation order. Therefore, the modulation order used for a UE 120 may decrease as the UE 120 moves farther from a BS 110 and/or as channel conditions of the UE 120 worsen. In such a case, the lower modulation order may be considered to be more robust than the higher modulation order.

As bandwidth and throughput needs increase, some wireless communication standards are moving toward usage of higher modulation orders. For example, 1024-QAM on the downlink may be implemented for UEs as part of an upcoming Third Generation Partnership Project (3GPP) release. In such a case, the 1024-QAM modulation order may be enabled or disabled by a base station 110 via RRC configuration signaling. An RRC message may include, for example, a table parameter (e.g., the parameter mcs-Table-r17) that indicates a modulation and MCS table to use for identifying a modulation order and a target code rate to be used in decoding a received physical downlink shared channel (PDSCH) communication.

In some cases, the 1024-QAM MCS table may be indicated only by RRC configuration signaling for PDSCH (e.g., PDSCH-Config). Thus, a UE 120 may not be able to dynamically switch to using the 1024-QAM MCS table to decode transmissions that are encoded using different MCSs (e.g., based on movement of the UE 120 and/or the base station 110). Moreover, in such cases, indication of the 1024-QAM MCS table may be unavailable for semi-persistent scheduling (SPS) configurations. As a result, restricting indication and configuration of the 1024-QAM MCS table to RRC signaling may cause network inefficiencies, which may have a negative effect on network performance.

Furthermore, a UE 120 may generate CSI feedback based at least in part on a CSI reference signal. The UE 120 may determine which MCS table and/or table feature to use based at least in part on CSI. In some cases, the MCS table used for reporting CSI may be reported using a parameter (cqi-Table) based on CQI. It may be difficult for UE 120 to support 1024-QAM and lower modulation orders with multiple repetitions (e.g., 16-QAM and/or the like) with the same RRC signaling. This may be particularly undesirable when coverage changes frequently, necessitating frequent switches between CSI reference resource sizes, repetition schemes, and modulation schemes, which may require RRC signaling overhead.

Some techniques and apparatuses described herein may provide improved efficiency and versatility for communications between UEs and base stations that are associated with a higher modulation order by enabling dynamic indication and/or configuration of 1024-QAM MCS tables. In some aspects, a UE 120 may receive a DCI transmission that includes a PDSCH resource allocation for downlink traffic. The DCI transmission may include at least one dedicated table bit that may indicate whether the UE is to use, to decode the downlink traffic, a first modulation order and a first target code rate corresponding to a first MCS table or a second modulation order and a second target code rate corresponding to a second MCS table, where the second MCS table corresponds to 1024-QAM. The UE may decode the downlink traffic according to the first modulation order and the first target code rate or the second modulation order and the second target code rate based at least in part on at least one value of the at least one dedicated table bit. In this way, versatility of downlink grants is improved by enabling dynamic indication and/or configuration of 1024-QAM MCS tables.

Figure 3:
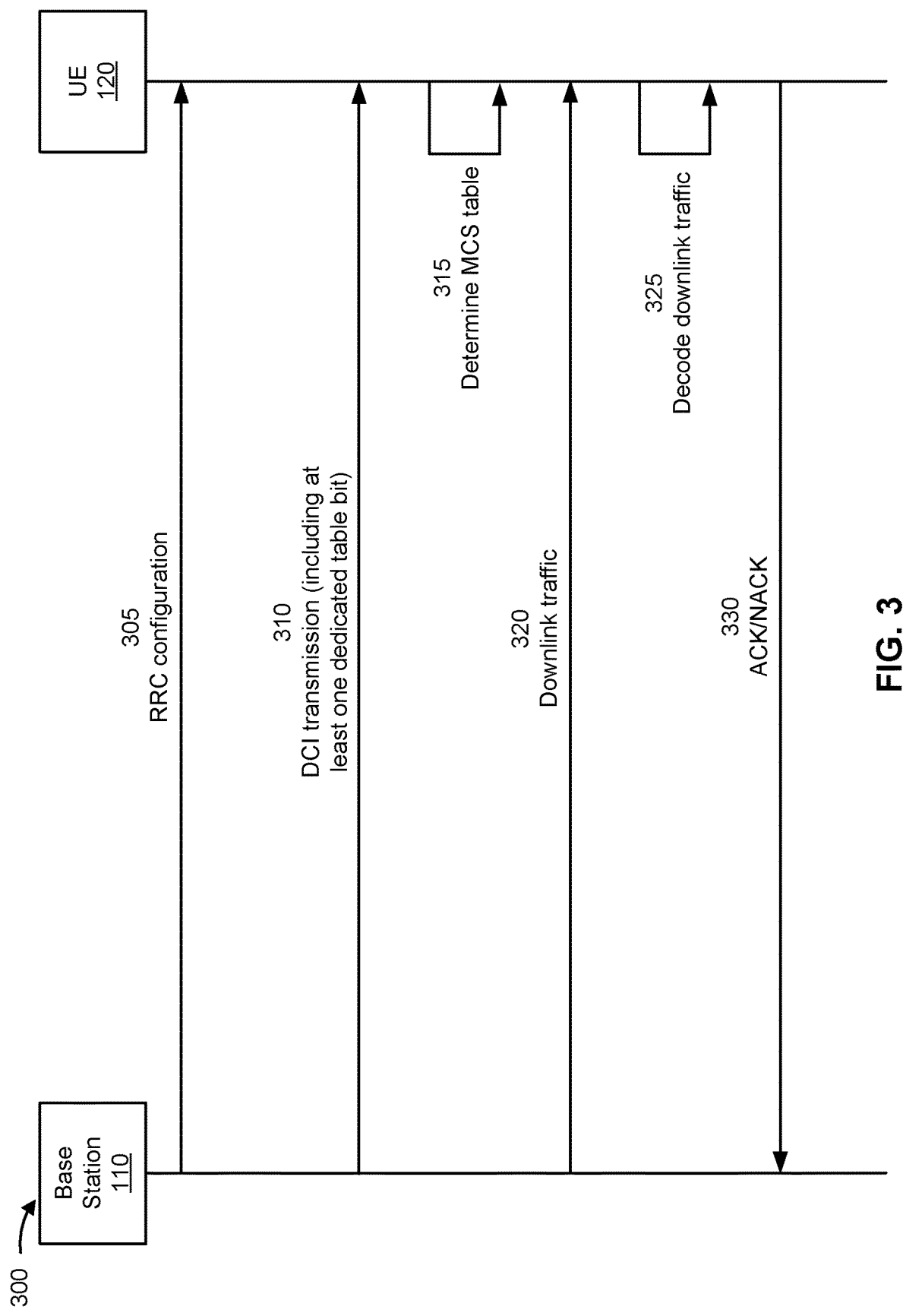
FIG. 3 is a diagram illustrating an example of signaling for 1024 quadrature amplitude modulation (QAM) table indication and configuration, in accordance with the present disclosure.

FIG. 3 is a diagram illustrating an example of signaling for 1024-QAM table indication and configuration, in accordance with the present disclosure. As shown, a base station 110 and a UE 120 may communication with one another.

As shown by reference number 305, the base station 110 may transmit, and the UE 120 may receive, an RRC configuration message. The RRC configuration message may configure any number of RRC parameters. The RRC configuration may include a PDSCH configuration (e.g., PDSCH-Config). In some aspects, the RRC configuration message may configure higher layer table parameters (e.g., mcs-TableForDCI-Format1-2-r17 and/or mcs-Table-r17). In some aspects, the UE 120 and/or the base station 110 may transmit a MAC CE to enable one or more functionalities associated with at least one dedicated table bit that may have a value that indicates a 1024-QAM MCS table (and/or one or more indexes within the 1024-QAM MCS table). In some aspects, for example, the MAC CE may overwrite the RRC configured parameters.

In some aspects, the RRC configuration may include an SPS configuration (e.g., SPS-Config), The SPS configuration may include a set of default MCS parameters (which may also be known as "fallback MCS parameters") associated with an MCS table corresponding to a lower QAM than an MCS table corresponding to a set of current (e.g., configured and/or dynamically indicated and/or activated) MCS parameters.

In some aspects, the SPS configuration may include a group configuration that indicates an association between a group of SPS configurations and a set of MCS parameters. One or more groups of SPS configurations may be identified using at least one table bit in a DCI transmission, for example. In some aspects, the SPS configurations may be grouped based at least in part on transmission priority, values in a DCI transmission, and/or time domain resource allocations, among other examples. For example, in some aspects, the at least one dedicated table bit may indicate a priority level. A high priority transmission may include, for example, a URLLC transmission, and a low priority transmission may include, for example, an eMBB transmission. Each SPS configuration in a group may include the same default parameters as each other SPS configuration in the group. Each set of default parameters may correspond to a specified MCS table (e.g., a 64-QAM table, a 256-QAM table, and/or a 1024-QAM table, among other examples).

As shown by reference number 310, the base station 110 may transmit, and the UE 120 may receive, a DCI transmission that includes a PDSCH resource allocation for downlink traffic. The DCI transmission may include at least one dedicated table bit that indicates whether the UE is to use, to decode the downlink traffic, a first modulation order and a first target code rate corresponding to a first MCS table or a second modulation order and a second target code rate corresponding to a second MCS table. The second MCS table (which may be indicated as "1024-QAM table" or "qam1024") may correspond to 1024-QAM. The first MCS table may include a 256-QAM table (which may be indicated as "256-QAM table" or "qam256") or a 64-QAM low spectral efficiency (SE) table (which may be indicated as "qam64LowSE").

In some aspects, the at least one dedicated table bit may include a single bit. In other aspects, the at least one dedicated table bit may include a plurality of dedicated table bits that indicate whether the UE is to use, to decode the downlink traffic, a first modulation order and a first target code rate corresponding to a first MCS table, a second modulation order and a second target code rate corresponding to a second MCS table, or at least a third modulation order and at least a third target code rate corresponding to at least a third MCS table. In some aspects, the at least one dedicated table bit may indicate a value of a table parameter.

As shown by reference number 315, the UE 120 may determine, based at least in part on the at least one dedicated table bit, the MCS table to use for decoding downlink traffic. For example, in some aspects, the UE 120 may determine whether to use the first modulation order and the first target code rate or the second modulation order and the second target code rate based at least in part on a value of a single bit. In some aspects, where the DCI corresponds to an RNTI, and the UE 120 may determine whether to use the first modulation order and the first target code rate or the second modulation order and the second target code rate based at least in part on a value of the single bit. The UE 120 may determine whether to use the first modulation order and the first target code rate or the second modulation order and the second target code rate regardless of the RNTI. In some aspects, where the DCI corresponds to an RNTI, the UE 120 may determine whether to use the first modulation order and the first target code rate or the second modulation order and the second target code rate based at least in part on the RNTI. For example, in some aspects, the UE may select the 1024-QAM MCS table if the at least one dedicated table bit has a value of one. The UE may select the 64-QAM table or the 256-QAM table if the at least one dedicated table bit has a value of zero. In some aspects, a single bit may be added to a DCI transmission to indicate the first MCS table or the second MCS table.

In some aspects, the UE 120 may determine the MCS table to use based at least in part on a wireless communication standard that specifies a number of conditions and/or alternatives. In some aspects, the standard may incorporate a table parameter that may have a number of values, each indicating one of a set of MCS tables (and/or indexes within a table of the set of MCS tables).

For example, in some aspects, the UE 120 may select the second MCS table based at least in part on a determination that the value of the table parameter corresponds to the second MCS table, that the UE 120 is not configured with an MCS-cell-radio network temporary identifier, and that the DCI transmission comprises a DCI 1_2 format having a cyclic redundancy check scrambled by a cell radio network temporary identifier. In some aspects, the UE 120 may select the second MCS table based at least in part on a determination that the value of the table parameter corresponds to the second MCS table, that the UE 120 is not configured with an MCS-cell-radio network temporary identifier, and that the DCI transmission comprises a DCI format other than DCI format 1_2 in a UE-specific search space having a cyclic redundancy check scrambled by a cell radio network temporary identifier.

In some aspects, the UE 120 may select the second MCS table based at least in part on a determination that the value of the table parameter corresponds to the second MCS table, that the UE 120 is configured with an MCS-cell-radio network temporary identifier 2 (MCS-C-RNTI2), and that the DCI transmission comprises a cyclic redundancy check scrambled by the MCS-C-RNTI2. In some aspects, the UE 120 may select the second MCS table based at least in part on a determination that the value of the table parameter corresponds to the second MCS table, that the UE 120 is not configured with an SPS dedicated table parameter, and that the DCI transmission comprises a DCI format 1_2 having a cyclic redundancy check scrambled by a configured scheduling radio network temporary identifier or that SPS is activated by the DCI format 1_2 without a corresponding physical downlink control channel transmission.

In some aspects, the UE 120 may select the second MCS table based at least in part on a determination that the value of the table parameter corresponds to the second MCS table, that the UE 120 is not configured with an SPS dedicated table parameter, and that the DCI transmission comprises a DCI format 1_1 having a cyclic redundancy check scrambled by a configured scheduling radio network temporary identifier or that SPS is activated by the DCI format 1_1 without a corresponding physical downlink control channel transmission.

In some aspects, the wireless communication standard may specify one or more table parameters (e.g., mcs-TableForDCI-Format1-2-r17, mcs-table-r17, mcs-table-rel17) that may be configured to have a value that indicates a 1024-QAM MCS table. In this way, for example, the selections above may be specified as a series of if-then decision statements such as the following:

For the PDSCH scheduled by a PDCCH with DCI format 1_0, format 1_1 or format 1_2 with cyclic redundancy check (CRC) scrambled by CRNTI, MCS-C-RNTI, temporary C-RNTI (TC-RNTI), CS-RNTI, system information (SI)-RNTI, random access (RA)-RNTI, message B (MsgB)-RNTI, or paging (P)-RNTI, or for the PDSCH scheduled without corresponding PDCCH transmissions using the higher-layer-provided PDSCH configuration SPSConfig, if the higher layer parameter mcs-TableForDCI-Format1-2-r16 (or, if supported, mcs-TableForDCI-Format1-2-r17) given by PDSCH-Config is set to 'qam256', and the
PDSCH is scheduled by a PDCCH with DCI format 1_2 with CRC scrambled by C-RNTI
the UE shall use IMCS and Table 5.1.3.1-2 to determine the modulation order (Qm) and Target code rate (R) used in the physical downlink shared channel.
elseif the UE is not configured with MCS-C-RNTI, the higher layer parameter mcs-TableForDCI-Format1-2-r16 (mcs-TableForDCI-Format1-2-r17) given by PDSCH-Config is set to 'qam64LowSE', and the PDSCH is scheduled by a PDCCH with DCI format 1_2 scrambled by C-RNTI
the UE shall use IMCS and Table 5.1.3.1-3 to determine the modulation order (Qm) and Target code rate (R) used in the physical downlink shared channel.
elseif the UE is not configured with MCS-C-RNTI, the higher layer parameter mcs-TableForDCI-Format1-2-r17 given by PDSCH-Config is set to qam1024, and the PDSCH is scheduled by a PDCCH with DCI format 1_2 scrambled by C-RNTI
the UE shall use IMCS and 1024-QAM table to determine the modulation order (Qm) and Target code rate (R) used in the physical downlink shared channel.
elseif the higher layer parameter mcs-Table (mcs-Table-r17) given by PDSCH-Config is set to 'qam256', and the PDSCH is scheduled by a PDCCH with DCI format 1_1 with CRC scrambled by C-RNTI
the UE shall use IMCS and Table 5.1.3.1-2 to determine the modulation order (Qm) and Target code rate (R) used in the physical downlink shared channel.
elseif the UE is not configured with MCS-C-RNTI, the higher layer parameter mcs-Table (mcs-Table-r17) given by PDSCH-Config is set to 'qam64LowSE', and the PDSCH is scheduled by a PDCCH with a DCI format other than DCI format 1_2 in a UE-specific search space with CRC scrambled by C-RNTI
the UE shall use IMCS and Table 5.1.3.1-3 to determine the modulation order (Qm) and Target code rate (R) used in the physical downlink shared channel.
elseif the UE is not configured with MCS-C-RNTI, the higher layer parameter mcs-Table-r17 given by PDSCH-Config is set to 'qam1024', and the PDSCH is scheduled by a PDCCH with a DCI format other than DCI format 1_2 in a UE-specific search space with CRC scrambled by C-RNTI
the UE shall use IMCS and 1024QAM Table to determine the modulation order (Qm) and Target code rate (R) used in the physical downlink shared channel.
else if the UE is configured with MCS-C-RNTI, and the PDSCH is scheduled by a PDCCH with CRC scrambled by MCS-C-RNTI
the UE shall use IMCS and Table 5.1.3.1-3 to determine the modulation order (Qm) and Target code rate (R) used in the physical downlink shared channel.
elseif the UE is configured with MCS-C-RNTI2, and the PDSCH is scheduled by a PDCCH with CRC scrambled by MCS-C-RNTI2
the UE shall use IMCS and 1024-QAM Table to determine the modulation order (Qm) and Target code rate (R) used in the physical downlink shared channel.
elseif the UE is not configured with the higher layer parameter mcs-Table (mcs-Table Rel-17) given by SPS-config, and the higher layer parameter mcs-TableForDCI-Format1-2-r16 (mcs-TableForDCI-Format1-2-r17) given by PDSCH-Config is set to 'qam256',
if the PDSCH is scheduled by a PDCCH with DCI format 1_2 with CRC scrambled by CS-RNTI or
if the PDSCH with SPS activated by DCI format 1_2 is scheduled without corresponding PDCCH transmission using SPS-Config,
the UE shall use IMCS and Table 5.1.3.1-2 to determine the modulation order (Qm) and Target code rate (R) used in the physical downlink shared channel.
elseif the UE is not configured with the higher layer parameter mcs-Table (mcs-Table Rel-17) given by SPS-config, and the higher layer parameter mcs-TableForDCI-Format1-2-r17 given by PDSCH-Config is set to qam1024
if the PDSCH is scheduled by a PDCCH with DCI format 1_2 with CRC scrambled by CS-RNTI or
if the PDSCH with SPS activated by DCI format 1_2 is scheduled without corresponding PDCCH transmission using SPS-Config,
the UE shall use IMCS and 1024-QAM table to determine the modulation order (Qm) and Target code rate (R) used in the physical downlink shared channel.

elseif the UE is not configured with the higher layer parameter mcs-Table (mcs-Table Rel-17) given by SPS-Config, and the higher layer parameter mcs-Table (mcs-table rel 17) given by PDSCH-Config is set to 'qam256',
  if the PDSCH is scheduled by a PDCCH with DCI format 1_1 with CRC scrambled by CS-RNTI or
  if the PDSCH with SPS activated by DCI format 1_1 is scheduled without corresponding PDCCH transmission using SPS-Config,
  the UE shall use IMCS and Table 5.1.3.1-2 to determine the modulation order (Qm) and Target code rate (R) used in the physical downlink shared channel.
elseif the UE is not configured with the higher layer parameter mcs-table rel7 given by SPS-Config, and the higher layer parameter mcs-table rel17 given by PDSCH-Config is set to qam 1024
  if the PDSCH is scheduled by a PDCCH with DCI format 1_1 with CRC scrambled by CS-RNTI or
  if the PDSCH with SPS activated by DCI format 1_1 is scheduled without corresponding PDCCH transmission using SPS-Config,
  the UE shall use IMCS and 1024QAM Table to determine the modulation order (Qm) and Target code rate (R) used in the physical downlink shared channel.
elseif the UE is configured with the higher layer parameter mcs-Table (mcs-Table Rel-17) given by SPS-Config set to 'qam64LowSE'
  if the PDSCH is scheduled by a PDCCH with CRC scrambled by CS-RNTI or
  if the PDSCH is scheduled without corresponding PDCCH transmission using SPS-Config,
  the UE shall use IMCS and Table 5.1.3.1-3 to determine the modulation order (Qm) and Target code rate (R) used in the physical downlink shared channel.
else
  the UE shall use IMCS and Table 5.1.3.1-1 to determine the modulation order (Qm) and Target code rate (R) used in the physical downlink shared channel.

Any number of modifications to the language above may be included and considered to be within the ambit of the present disclosure.

As shown by reference number 320, the base station 110 may transmit, and the UE 120 may receive, downlink traffic that is encoded in accordance with the indications in the DCI transmission. As shown by reference number 325, the UE 120 may decode the downlink traffic according to the first modulation order and the first target code rate or the second modulation order and the second target code rate based at least in part on at least one value of the at least one dedicated table bit.

As shown by reference number 330, the UE 120 may transmit, and the base station 110 may receive, an acknowledgement (ACK)/negative acknowledgement (NACK) indicating whether the downlink traffic was successfully decoded. In some aspects, the UE 120 may determine that a number of NACKs transmitted within a measurement window satisfies a threshold. The UE 120 may select a set of default MCS parameters based at least in part on determining that the number of NACKs satisfies the threshold.

In some aspects, the UE 120 may measure CSI and transmit a CSI report that indicates a suggested MCS table to be used in interpreting the CSI report. In some aspects, the base station 110 may transmit, and the UE 120 may receive an indication, based at least in part on the suggested MCS table, to use one or more MCS tables in computing a CQI.

As indicated above, FIG. 3 is provided as an example. Other examples may differ from what is described with regard to FIG. 3.

Figure 4:
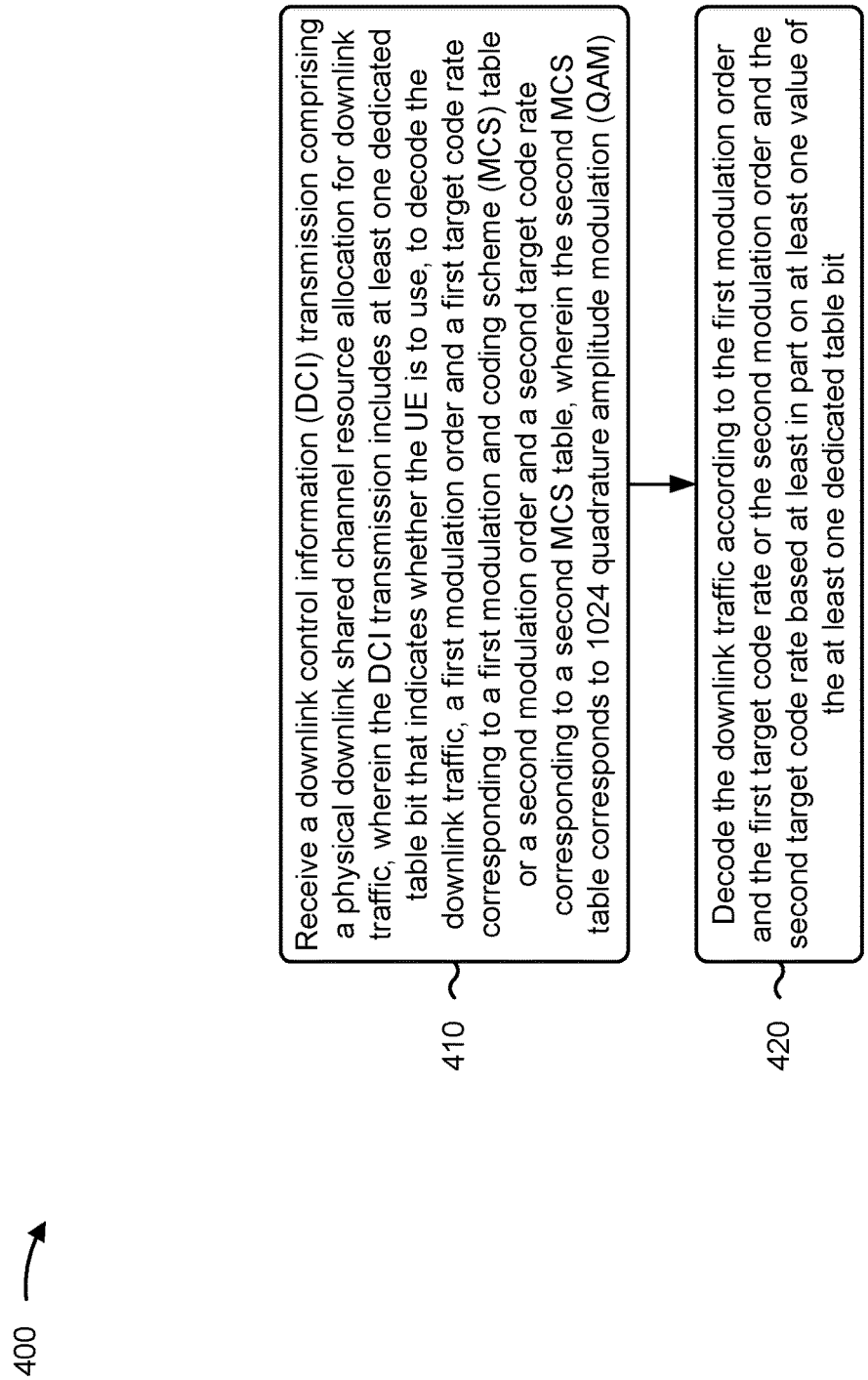
FIGS. 4 and 5 are diagrams illustrating example processes associated with signaling for 1024-QAM table indication and configuration, in accordance with the present disclosure.

FIG. 4 is a diagram illustrating an example process 400 performed, for example, by a UE, in accordance with various aspects of the present disclosure. Example process 400 is an example where the UE (e.g., UE 120) performs operations associated with signaling for 1024-QAM table indication and configuration.

As shown in FIG. 4, in some aspects, process 400 may include receiving a DCI transmission comprising a PDSCH resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table, wherein the second MCS table corresponds to 1024-QAM (block 410). For example, the UE (e.g., using reception component 602, depicted in FIG. 6) may receive a DCI transmission comprising a PDSCH resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table, wherein the second MCS table corresponds to 1024-QAM, as described above.

As further shown in FIG. 4, in some aspects, process 400 may include decoding the downlink traffic according to the first modulation order and the first target code rate or the second modulation order and the second target code rate based at least in part on at least one value of the at least one dedicated table bit (block 420). For example, the UE (e.g., using determination component 608, depicted in FIG. 6) may decode the downlink traffic according to the first modulation order and the first target code rate or the second modulation order and the second target code rate based at least in part on at least one value of the at least one dedicated table bit, as described above.

Process 400 may include additional aspects, such as any single aspect or any combination of aspects described below and/or in connection with one or more other processes described elsewhere herein.

In a first aspect, the first MCS table comprises at least one of a 256-QAM table, or a 64-QAM low spectral efficiency table.

In a second aspect, alone or in combination with the first aspect, the at least one dedicated table bit comprises a single bit.

In a third aspect, alone or in combination with one or more of the first and second aspects, process 400 includes determining whether to use the first modulation order and the first target code rate or the second modulation order and the second target code rate based at least in part on a value of the single bit.

In a fourth aspect, alone or in combination with one or more of the first through third aspects, the DCI corresponds to an RNTI, and wherein determining whether to use the first modulation order and the first target code rate or the second modulation order and the second target code rate based at least in part on a value of the single bit comprises determining whether to use the first modulation order and the first target code rate or the second modulation order and the second target code rate regardless of the RNTI.

In a fifth aspect, alone or in combination with one or more of the first through fourth aspects, the DCI corresponds to an RNTI, and wherein determining whether to use the first modulation order and the first target code rate or the second modulation order and the second target code rate based at least in part on a value of the single bit comprises determining whether to use the first modulation order and the first target code rate or the second modulation order and the second target code rate based at least in part on the RNTI.

In a sixth aspect, alone or in combination with one or more of the first through fifth aspects, the at least one dedicated table bit comprises a plurality of dedicated table bits that indicate whether the UE is to use, to decode the downlink traffic, a first modulation order and a first target code rate corresponding to a first MCS table, a second modulation order and a second target code rate corresponding to a second MCS table, or at least a third modulation order and at least a third target code rate corresponding to at least a third MCS table.

In a seventh aspect, alone or in combination with one or more of the first through sixth aspects, the at least one dedicated table bit indicates a value of a table parameter.

In an eighth aspect, alone or in combination with one or more of the first through seventh aspects, process 400 includes selecting the second MCS table based at least in part on a determination that the value of the table parameter corresponds to the second MCS table, that the UE is not configured with an MCS-cell-radio network temporary identifier, and that the DCI transmission comprises a DCI 1_2 format having a cyclic redundancy check scrambled by a cell radio network temporary identifier.

In a ninth aspect, alone or in combination with one or more of the first through eighth aspects, process 400 includes selecting the second MCS table based at least in part on a determination that the value of the table parameter corresponds to the second MCS table, that the UE is not configured with an MCS-cell-radio network temporary identifier, and that the DCI transmission comprises a DCI format other than DCI format 1_2 in a UE-specific search space having a cyclic redundancy check scrambled by a cell radio network temporary identifier.

In a tenth aspect, alone or in combination with one or more of the first through ninth aspects, process 400 includes selecting the second MCS table based at least in part on a determination that the value of the table parameter corresponds to the second MCS table, that the UE is configured with an MCS-C-RNTI2, and that the DCI transmission comprises a cyclic redundancy check scrambled by the MCS-C-RNTI2.

In an eleventh aspect, alone or in combination with one or more of the first through tenth aspects, process 400 includes selecting the second MCS table based at least in part on a determination that the value of the table parameter corresponds to the second MCS table, that the UE is not configured with an SPS dedicated table parameter, and that the DCI transmission comprises a DCI format 1_2 having a cyclic redundancy check scrambled by a configured scheduling radio network temporary identifier or that SPS is activated by the DCI format 1_2 without a corresponding physical downlink control channel transmission.

In a twelfth aspect, alone or in combination with one or more of the first through eleventh aspects, process 400 includes selecting the second MCS table based at least in part on a determination that the value of the table parameter corresponds to the second MCS table, that the UE is not configured with an SPS dedicated table parameter, and that the DCI transmission comprises a DCI format 1_1 having a cyclic redundancy check scrambled by a configured scheduling radio network temporary identifier or that SPS is activated by the DCI format 1_1 without a corresponding physical downlink control channel transmission.

In a thirteenth aspect, alone or in combination with one or more of the first through twelfth aspects, process 400 includes transmitting a MAC CE to overwrite an RRC configuration to enable one or more functionalities associated with the at least one dedicated table bit.

In a fourteenth aspect, alone or in combination with one or more of the first through thirteenth aspects, process 400 includes receiving an SPS configuration that comprises a set of default MCS parameters associated with an MCS table corresponding to a lower QAM than an MCS table corresponding to a set of current MCS parameters.

In a fifteenth aspect, alone or in combination with one or more of the first through fourteenth aspects, process 400 includes determining that a number of negative acknowledgements transmitted within a measurement window satisfies a threshold, and selecting the set of default MCS parameters based at least in part on determining that the number of negative acknowledgements satisfies the threshold.

In a sixteenth aspect, alone or in combination with one or more of the first through fifteenth aspects, process 400 includes receiving a group configuration that indicates an association between a group of SPS configurations and a set of MCS parameters, wherein the at least one dedicated table bit indicates the group of SPS configurations.

In a seventeenth aspect, alone or in combination with one or more of the first through sixteenth aspects, the group of SPS configurations corresponds to a priority level, wherein the at least one dedicated table bit indicates the priority level.

In an eighteenth aspect, alone or in combination with one or more of the first through seventeenth aspects, process 400 includes transmitting a CSI report that indicates a suggested MCS table to be used in interpreting the CSI report.

In a nineteenth aspect, alone or in combination with one or more of the first through eighteenth aspects, process 400 includes receiving an indication, based at least in part on the suggested MCS table, to use one or more MCS tables in computing a channel quality indicator.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
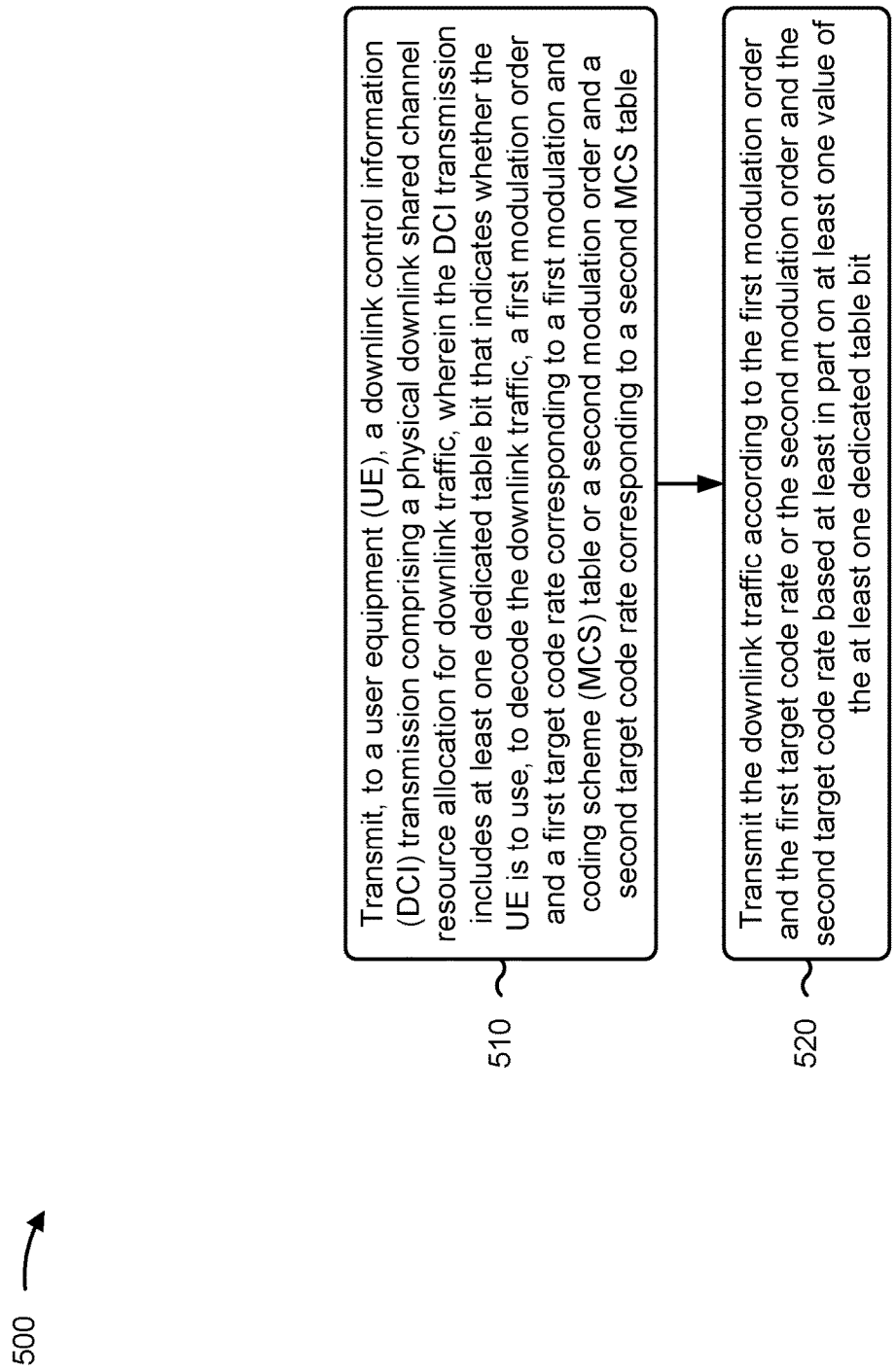

FIG. 5 is a diagram illustrating an example process 500 performed, for example, by a base station, in accordance with various aspects of the present disclosure. Example process 500 is an example where the base station (e.g., base station 110) performs operations associated with signaling for 1024-QAM table indication and configuration.

As shown in FIG. 5, in some aspects, process 500 may include transmitting, to a UE, a DCI transmission comprising a PDSCH resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table (block 510). For example, the base station (e.g., using transmission component 704, depicted in FIG. 7) may transmit, to a UE, a DCI transmission comprising a PDSCH resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table, as described above.

As further shown in FIG. 5, in some aspects, process 500 may include transmitting the downlink traffic according to the first modulation order and the first target code rate or the second modulation order and the second target code rate based at least in part on at least one value of the at least one dedicated table bit (block 520). For example, the base station (e.g., using transmission component 704, depicted in FIG. 7) may transmit the downlink traffic according to the first modulation order and the first target code rate or the second modulation order and the second target code rate based at least in part on at least one value of the at least one dedicated table bit, as described above.

Process 500 may include additional aspects, such as any single aspect or any combination of aspects described below and/or in connection with one or more other processes described elsewhere herein.

In a first aspect, the first MCS table comprises at least one of a 256-QAM table, or a 64-QAM low SE table.

In a second aspect, alone or in combination with the first aspect, the at least one dedicated table bit comprises a single bit.

In a third aspect, alone or in combination with one or more of the first and second aspects, the DCI corresponds to an RNTI, and wherein a determination of whether to use the first modulation order and the first target code rate or the second modulation order and the second target code rate based at least in part on a value of the single bit is based at least in part on a determination of whether to use the first modulation order and the first target code rate or the second modulation order and the second target code rate regardless of the RNTI.

In a fourth aspect, alone or in combination with one or more of the first through third aspects, the DCI corresponds to an RNTI, and wherein a determination of whether to use the first modulation order and the first target code rate or the second modulation order and the second target code rate based at least in part on a value of the single bit is based at least in part on a determination of whether to use the first modulation order and the first target code rate or the second modulation order and the second target code rate based at least in part on the RNTI.

In a fifth aspect, alone or in combination with one or more of the first through fourth aspects, the at least one dedicated table bit indicates a value of a table parameter.

In a sixth aspect, alone or in combination with one or more of the first through fifth aspects, process 500 includes transmitting an SPS configuration that comprises a set of default MCS parameters associated with an MCS table corresponding to a lower QAM than an MCS table corresponding to a set of current MCS parameters.

In a seventh aspect, alone or in combination with one or more of the first through sixth aspects, process 500 includes transmitting a group configuration that indicates an association between a group of SPS configurations and a set of MCS parameters, wherein the at least one dedicated table bit indicates the group of SPS configurations.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
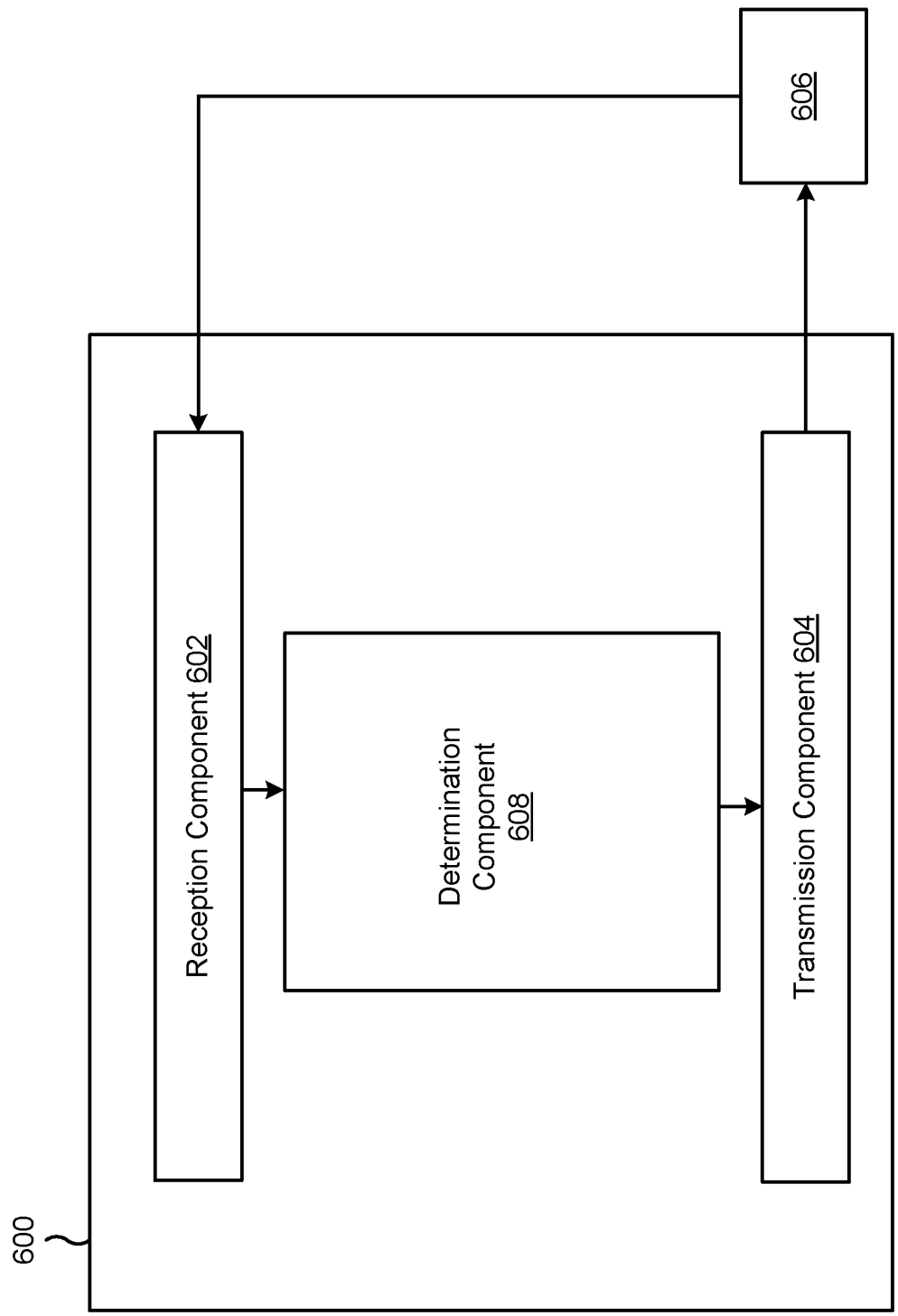
FIGS. 6 and 7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a determination component 608.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive a DCI transmission comprising a PDSCH resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table, wherein the second MCS table corresponds to 1024-QAM. The determination component 608 may decode the downlink traffic according to the first modulation order and the first target code rate or the second modulation order and the second target code rate based at least in part on at least one value of the at least one dedicated table bit. In some aspects, the determination component 608 may include one or more antennas, a modulator, a transmit MIMO processor, a transmit processor, a controller/processor, a memory, or a combination thereof, of the UE described above in connection with FIG. 2. In some aspects, the determination component 608 includes the reception component 602 and/or the transmission component 604.

The determination component 608 may determine whether to use the first modulation order and the first target code rate or the second modulation order and the second target code rate based at least in part on a value of the single bit. The determination component 608 may select the second MCS table based at least in part on a determination that the value of the table parameter corresponds to the second MCS table, that the UE is not configured with an MCS-cell-radio network temporary identifier, and that the DCI transmission comprises a DCI 1_2 format having a cyclic redundancy check scrambled by a cell radio network temporary identifier.

The determination component 608 may select the second MCS table based at least in part on a determination that the value of the table parameter corresponds to the second MCS table, that the UE is not configured with an MCS-C-RNTI, and that the DCI transmission comprises a DCI format other than DCI format 1_2 in a UE-specific search space having a CRC scrambled by a C-RNTI.

The determination component 608 may select the second MCS table based at least in part on a determination that the value of the table parameter corresponds to the second MCS table, that the UE is configured with an MCS-C-RNTI2, and that the DCI transmission comprises a CRC scrambled by the MCS-C-RNTI2.

The determination component 608 may select the second MCS table based at least in part on a determination that the value of the table parameter corresponds to the second MCS table, that the UE is not configured with an SPS dedicated table parameter, and that the DCI transmission comprises a DCI format 1_2 having a cyclic redundancy check scrambled by a configured scheduling radio network temporary identifier or that SPS is activated by the DCI format 1_2 without a corresponding PDSCH transmission.

The determination component 608 may select the second MCS table based at least in part on a determination that the value of the table parameter corresponds to the second MCS table, that the UE is not configured with an SPS dedicated table parameter, and that the DCI transmission comprises a DCI format 1_1 having CRC scrambled by a CS-RNTI or that SPS is activated by the DCI format 1_1 without a corresponding PDSCH transmission.

The transmission component 604 may transmit a MAC CE to overwrite an RRC configuration to enable one or more functionalities associated with the at least one dedicated table bit.

The reception component 602 may receive an SPS configuration that comprises a set of default MCS parameters associated with an MCS table corresponding to a lower QAM than an MCS table corresponding to a set of current MCS parameters.

The determination component 608 may determine that a number of NACKs transmitted within a measurement window satisfies a threshold. The determination component 608 may select the set of default MCS parameters based at least in part on determining that the number of NACKs satisfies the threshold.

The reception component 602 may receive a group configuration that indicates an association between a group of SPS configurations and a set of MCS parameters wherein the at least one dedicated table bit indicates the group of SPS configurations.

The transmission component 604 may transmit a CSI report that indicates a suggested MCS table to be used in interpreting the CSI report. The reception component 602 may receive an indication, based at least in part on the suggested MCS table, to use one or more MCS tables in computing a CQI.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
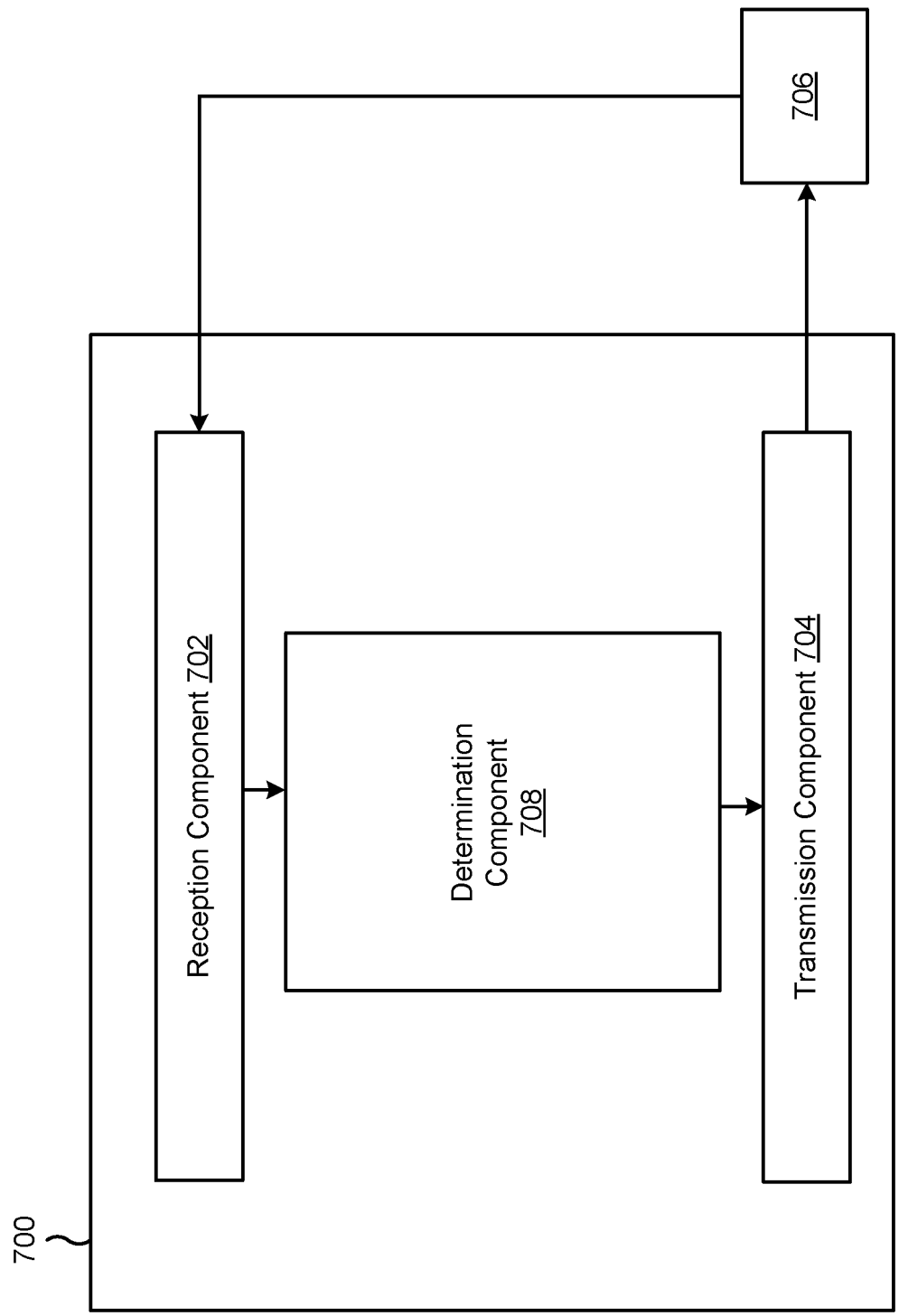

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a determination component 708.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The transmission component 704 may transmit, to a UE, a DCI transmission comprising a PDSCH resource allocation for downlink traffic, wherein the DCI transmission includes at least one dedicated table bit that indicates whether the UE is to use, to decode the downlink traffic, a first modulation order and a first target code rate corresponding to a first MCS table or a second modulation order and a second target code rate corresponding to a second MCS table. The transmission component 704 may transmit the downlink traffic according to the first modulation order and the first target code rate or the second modulation order and the second target code rate based at least in part on at least one value of the at least one dedicated table bit.

The transmission component 704 may transmit an SPS configuration that comprises a set of default MCS parameters associated with an MCS table corresponding to a lower QAM than an MCS table corresponding to a set of current MCS parameters.

The transmission component 704 may transmit a group configuration that indicates an association between a group of SPS configurations and a set of MCS parameters wherein the at least one dedicated table bit indicates the group of SPS configurations.

The determination component 708 may determine one or more MCS parameters, MCS tables, indexes associated with one or MCS tables, and/or configurations, among other examples. In some aspects, the determination component 708 may include one or more antennas, a modulator, a transmit MIMO processor, a transmit processor, a controller/processor, a memory, or a combination thereof, of the base station described above in connection with FIG. 2. In some aspects, the determination component 708 may include the reception component 702 and/or the transmission component 704.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving a downlink control information (DCI) transmission comprising a physical downlink shared channel resource allocation for downlink traffic, wherein the DCI transmission includes at least one dedicated table bit that indicates whether the UE is to use, to decode the downlink traffic, a first modulation order and a first target code rate corresponding to a first modulation and coding scheme (MCS) table or a second modulation order and a second target code rate corresponding to a second MCS table, wherein the second MCS table corresponds to 1024 quadrature amplitude modulation (QAM); and decoding the downlink traffic according to the first modulation order and the first target code rate or the second modulation order and the second target code rate based at least in part on at least one value of the at least one dedicated table bit.

Aspect 2: The method of Aspect 1, wherein the first MCS table comprises at least one of: a 256-QAM table, or a 64-QAM low spectral efficiency table.

Aspect 3: The method of either of Aspects 1 or 2, wherein the at least one dedicated table bit comprises a single bit.

Aspect 4: The method of Aspect 3, further comprising determining whether to use the first modulation order and the first target code rate or the second modulation order and the second target code rate based at least in part on a value of the single bit.

Aspect 5: The method of Aspect 4, wherein the DCI corresponds to a radio network temporary identifier (RNTI), and wherein determining whether to use the first modulation order and the first target code rate or the second modulation order and the second target code rate based at least in part on a value of the single bit comprises determining whether to use the first modulation order and the first target code rate or the second modulation order and the second target code rate regardless of the RNTI.

Aspect 6: The method of Aspect 4, wherein the DCI corresponds to a radio network temporary identifier (RNTI), and wherein determining whether to use the first modulation order and the first target code rate or the second modulation order and the second target code rate based at least in part on a value of the single bit comprises determining whether to use the first modulation order and the first target code rate or the second modulation order and the second target code rate based at least in part on the RNTI.

Aspect 7: The method of any of Aspects 1-6, wherein the at least one dedicated table bit comprises a plurality of dedicated table bits that indicate whether the UE is to use, to decode the downlink traffic, a first modulation order and a first target code rate corresponding to a first MCS table, a second modulation order and a second target code rate corresponding to a second MCS table, or at least a third modulation order and at least a third target code rate corresponding to at least a third MCS table.

Aspect 8: The method of either of Aspects 1 or 2, wherein the at least one dedicated table bit indicates a value of a table parameter.

Aspect 9: The method of Aspect 8, further comprising selecting the second MCS table based at least in part on a determination that the value of the table parameter corresponds to the second MCS table, that the UE is not configured with an MCS-cell-radio network temporary identifier, and that the DCI transmission comprises a DCI 1_2 format having a cyclic redundancy check scrambled by a cell radio network temporary identifier.

Aspect 10: The method of Aspect 8, further comprising selecting the second MCS table based at least in part on a determination that the value of the table parameter corresponds to the second MCS table, that the UE is not configured with an MCS-cell-radio network temporary identifier, and that the DCI transmission comprises a DCI format other than DCI format 1_2 in a UE-specific search space having a cyclic redundancy check scrambled by a cell radio network temporary identifier.

Aspect 11: The method of Aspect 8, further comprising selecting the second MCS table based at least in part on a determination that the value of the table parameter corresponds to the second MCS table, that the UE is configured with an MC S-cell-radio network temporary identifier 2 (MCS-C-RNTI2), and that the DCI transmission comprises a cyclic redundancy check scrambled by the MCS-C-RNTI2.

Aspect 12: The method of Aspect 8, further comprising selecting the second MCS table based at least in part on a determination that the value of the table parameter corresponds to the second MCS table, that the UE is not configured with a semi-persistent scheduling (SPS) dedicated table parameter, and that the DCI transmission comprises a DCI format 1_2 having a cyclic redundancy check scrambled by a configured scheduling radio network temporary identifier or that SPS is activated by the DCI format 1_2 without a corresponding physical downlink control channel transmission.

Aspect 13: The method of Aspect 8, further comprising selecting the second MCS table based at least in part on a determination that the value of the table parameter corresponds to the second MCS table, that the UE is not configured with a semi-persistent scheduling (SPS) dedicated table parameter, and that the DCI transmission comprises a DCI format 1_1 having a cyclic redundancy check scrambled by a configured scheduling radio network temporary identifier or that SPS is activated by the DCI format 1_1 without a corresponding physical downlink control channel transmission.

Aspect 14: The method of any of Aspects 1-13, further comprising transmitting a medium access control control element to overwrite a radio resource control configuration to enable one or more functionalities associated with the at least one dedicated table bit.

Aspect 15: The method of any of Aspects 1-14, further comprising receiving a semi-persistent scheduling configuration that comprises a set of default MCS parameters associated with an MCS table corresponding to a lower QAM than an MCS table corresponding to a set of current MCS parameters.

Aspect 16: The method of Aspect 15, further comprising: determining that a number of negative acknowledgements transmitted within a measurement window satisfies a threshold; and selecting the set of default MCS parameters based at least in part on determining that the number of negative acknowledgements satisfies the threshold.

Aspect 17: The method of any of Aspects 1-16, further comprising receiving a group configuration that indicates an association between a group of SPS configurations and a set of MCS parameters, wherein the at least one dedicated table bit indicates the group of SPS configurations.

Aspect 18: The method of Aspect 17, wherein the group of SPS configurations corresponds to a priority level, wherein the at least one dedicated table bit indicates the priority level.

Aspect 19: The method of any of Aspects 1-18, further comprising transmitting a channel state information (CSI) report that indicates a suggested MCS table to be used in interpreting the CSI report.

Aspect 20: The method of Aspect 19, further comprising receiving an indication, based at least in part on the suggested MCS table, to use one or more MCS tables in computing a channel quality indicator.

Aspect 21: A method of wireless communication performed by a base station, comprising: transmitting, to a user equipment (UE), a downlink control information (DCI) transmission comprising a physical downlink shared channel resource allocation for downlink traffic, wherein the DCI transmission includes at least one dedicated table bit that indicates whether the UE is to use, to decode the downlink traffic, a first modulation order and a first target code rate corresponding to a first modulation and coding scheme (MCS) table or a second modulation order and a second target code rate corresponding to a second MCS table, wherein the second MCS table corresponds to 1024 quadrature amplitude modulation (QAM); and transmitting the downlink traffic according to the first modulation order and the first target code rate or the second modulation order and the second target code rate based at least in part on at least one value of the at least one dedicated table bit.

Aspect 22: The method of Aspect 21, wherein the first MCS table comprises at least one of: a 256-QAM table, or a 64-QAM low spectral efficiency table.

Aspect 23: The method of either of Aspects 21 or 22, wherein the at least one dedicated table bit comprises a single bit.

Aspect 24: The method of Aspect 23, wherein the DCI corresponds to a radio network temporary identifier (RNTI), and wherein a determination of whether to use the first modulation order and the first target code rate or the second modulation order and the second target code rate based at least in part on a value of the single bit is based at least in part on a determination of whether to use the first modulation order and the first target code rate or the second modulation order and the second target code rate regardless of the RNTI.

Aspect 25: The method of Aspect 23, wherein the DCI corresponds to a radio network temporary identifier (RNTI), and wherein a determination of whether to use the first modulation order and the first target code rate or the second modulation order and the second target code rate based at least in part on a value of the single bit is based at least in part on a determination of whether to use the first modulation order and the first target code rate or the second modulation order and the second target code rate based at least in part on the RNTI.

Aspect 26: The method of any of Aspects 21-25, wherein the at least one dedicated table bit indicates a value of a table parameter.

Aspect 27: The method of any of Aspects 21-26, further comprising transmitting a semi-persistent scheduling configuration that comprises a set of default MCS parameters associated with an MCS table corresponding to a lower QAM than an MCS table corresponding to a set of current MCS parameters.

Aspect 28: The method of any of Aspects 21-27, further comprising transmitting a group configuration that indicates an association between a group of SPS configurations and a set of MCS parameters, wherein the at least one dedicated table bit indicates the group of SPS configurations.

Aspect 29: An apparatus for wireless communication at a device, comprising a processor; memory coupled with the processor; and instructions stored in the memory and executable by the processor to cause the apparatus to perform the method of one or more Aspects of Aspects 1-20.

Aspect 30: A device for wireless communication, comprising a memory and one or more processors coupled to the memory, the memory and the one or more processors configured to perform the method of one or more Aspects of Aspects 1-20.

Aspect 31: An apparatus for wireless communication, comprising at least one means for performing the method of one or more Aspects of Aspects 1-20.

Aspect 32: A non-transitory computer-readable medium storing code for wireless communication, the code comprising instructions executable by a processor to perform the method of one or more Aspects of Aspects 1-20.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-20.

Aspect 34: An apparatus for wireless communication at a device, comprising a processor; memory coupled with the processor; and instructions stored in the memory and executable by the processor to cause the apparatus to perform the method of one or more Aspects of Aspects 21-28.

Aspect 35: A device for wireless communication, comprising a memory and one or more processors coupled to the memory, the memory and the one or more processors configured to perform the method of one or more Aspects of Aspects 21-28.

Aspect 36: An apparatus for wireless communication, comprising at least one means for performing the method of one or more Aspects of Aspects 21-28.

Aspect 37: A non-transitory computer-readable medium storing code for wireless communication, the code comprising instructions executable by a processor to perform the method of one or more Aspects of Aspects 21-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 21-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a radio resource control (RRC) message that includes at least one dedicated table bit that indicates a modulation and coding scheme (MCS) table of a set of MCS tables and indicates whether the UE is to use, to decode downlink traffic, a first modulation order and a first target code rate corresponding to a first MCS table of the set of MCS tables or a second modulation order and a second target code rate corresponding to a second MCS table of the set of MCS tables, and wherein the second MCS table corresponds to 1024 quadrature amplitude modulation (QAM), and wherein the MCS table is the first MCS table or the second MCS table;
   receiving a downlink control information (DCI) transmission comprising a DCI format;
   selecting, based at least in part on at least one value of the at least one dedicated table bit in the RRC message and the DCI format, a modulation order and a target code rate corresponding to an MCS table of the set of MCS tables; and
   decoding the downlink traffic according to the selection of the modulation order and the target code rate.

2. The method of claim 1, wherein the first MCS table comprises at least one of:
   a 256-QAM table, or
   a 64-QAM low spectral efficiency table.

3. The method of claim 1, wherein the at least one dedicated table bit comprises a single bit.

4. The method of claim 3, further comprising:
   receiving, in the DCI transmission, a physical downlink shared channel resource allocation for the downlink traffic.

5. The method of claim 4, wherein the DCI corresponds to a radio network temporary identifier (RNTI), and wherein the selection of the modulation order and the target code rate is not based at least in part on the RNTI.

6. The method of claim 4, wherein the DCI corresponds to a radio network temporary identifier (RNTI), and wherein the selection of the modulation order and the target code rate is based at least in part on the RNTI.

7. The method of claim 1, wherein the at least one dedicated table bit comprises a plurality of dedicated table bits that indicate whether the UE is to use, to decode the downlink traffic, the first modulation order and the first target code rate corresponding to the first MCS table, the second modulation order and the second target code rate corresponding to the second MCS table, or at least a third modulation order and at least a third target code rate corresponding to at least a third MCS table.

8. The method of claim 1, wherein the at least one value of the at least one dedicated table bit in the RRC message is a value of a table parameter.

9. The method of claim 8, further comprising selecting the second MCS table based at least in part on a determination that the value of the table parameter corresponds to the second MCS table, that the UE is not configured with an MCS-cell-radio network temporary identifier, and that the DCI transmission associated with the downlink traffic comprises a DCI 1_2 format having a cyclic redundancy check scrambled by a cell radio network temporary identifier.

10. The method of claim 8, further comprising selecting the second MCS table based at least in part on a determination that the value of the table parameter corresponds to the second MCS table, that the UE is not configured with an MCS-cell-radio network temporary identifier, and that the DCI transmission associated with the downlink traffic comprises a DCI format other than DCI format 1_2 in a UE-specific search space having a cyclic redundancy check scrambled by a cell radio network temporary identifier.

11. The method of claim 8, further comprising selecting the second MCS table based at least in part on a determination that the value of the table parameter corresponds to the second MCS table, that the UE is configured with an MCS-cell-radio network temporary identifier 2 (MCS-C-RNTI2), and that the DCI transmission associated with the downlink traffic comprises a cyclic redundancy check scrambled by the MCS-C-RNTI2.

12. The method of claim 8, further comprising selecting the second MCS table based at least in part on a determination that the value of the table parameter corresponds to the second MCS table, that the UE is not configured with a semi-persistent scheduling (SPS) dedicated table parameter, and that the DCI transmission associated with the downlink traffic comprises a DCI format 1_2 having a cyclic redundancy check scrambled by a configured scheduling radio network temporary identifier or that SPS is activated by the DCI format 1_2 without a corresponding physical downlink control channel transmission.

13. The method of claim 8, further comprising selecting the second MCS table based at least in part on a determination that the value of the table parameter corresponds to the second MCS table, that the UE is not configured with a semi-persistent scheduling (SPS) dedicated table parameter, and that the DCI transmission associated with the downlink traffic comprises a DCI format 1_1 having a cyclic redundancy check scrambled by a configured scheduling radio network temporary identifier or that SPS is activated by the DCI format 1_1 without a corresponding physical downlink control channel transmission.

14. The method of claim 1, further comprising transmitting a medium access control (MAC) control element (CE) to overwrite the RRC message to enable one or more functionalities associated with the at least one dedicated table bit.

15. The method of claim 1, further comprising receiving a semi-persistent scheduling configuration that comprises a set of default MCS parameters associated with an MCS table corresponding to a lower QAM than an MCS table corresponding to a set of current MCS parameters.

16. The method of claim 15, further comprising:
   determining that a number of negative acknowledgements transmitted within a measurement window satisfies a threshold; and
   selecting the set of default MCS parameters based at least in part on determining that the number of negative acknowledgements satisfies the threshold.

17. The method of claim 1, further comprising receiving a group configuration that indicates an association between a group of SPS configurations and a set of MCS parameters, wherein the at least one dedicated table bit indicates the group of SPS configurations.

18. The method of claim 17, wherein the group of SPS configurations corresponds to a priority level, wherein the at least one dedicated table bit indicates the priority level.

19. The method of claim 1, further comprising transmitting a channel state information (CSI) report that indicates a suggested MCS table to be used in interpreting the CSI report.

20. The method of claim 19, further comprising receiving an indication, based at least in part on the suggested MCS table, to use one or more MCS tables in computing a channel quality indicator.

21. A method of wireless communication performed by a network entity, comprising:
- transmitting, to a user equipment (UE), a radio resource control (RRC) message that includes at least one dedicated table bit that indicates a modulation and coding scheme (MCS) table of a set of MCS tables and indicates whether the UE is to use, to decode downlink traffic, a first modulation order and a first target code rate corresponding to a first MCS table of the set of MCS tables or a second modulation order and a second target code rate corresponding to a second MCS table of the set of MCS tables, and wherein the MCS table is the first MCS table or the second MCS table;
- transmitting a downlink control information (DCI) transmission comprising a DCI format;
- selecting, based at least in part on at least one value of the at least one dedicated table bit in the RRC message and the DCI format, a modulation order and a target code rate corresponding to an MCS table of the set of MCS tables; and
- transmitting the downlink traffic according to the selection of the modulation order and the target code rate.

22. The method of claim 21, wherein the first MCS table comprises at least one of:
- a 256-QAM table, or
- a 64-QAM low spectral efficiency table.

23. The method of claim 21, wherein the at least one dedicated table bit comprises a single bit.

24. The method of claim 23, further comprising transmitting, in the DCI transmission, a physical downlink shared channel resource allocation for the downlink traffic wherein the DCI corresponds to a radio network temporary identifier (RNTI), and wherein the selection to use the modulation order and the target code rate is not based at least in part on the RNTI.

25. The method of claim 23, further comprising transmitting, in the DCI transmission, a physical downlink shared channel resource allocation for the downlink traffic wherein the DCI corresponds to a radio network temporary identifier (RNTI), and wherein the selection to use the modulation order and the target code rate is based at least in part on the RNTI.

26. The method of claim 21, wherein the at least one value of the at least one dedicated table bit in the RRC message is a value of a table parameter.

27. The method of claim 21, further comprising transmitting a semi-persistent scheduling configuration that comprises a set of default MCS parameters associated with an MCS table corresponding to a lower QAM than an MCS table corresponding to a set of current MCS parameters.

28. The method of claim 21, further comprising transmitting a group configuration that indicates an association between a group of SPS configurations and a set of MCS parameters,
- wherein the at least one dedicated table bit indicates the group of SPS configurations.

29. A user equipment (UE) for wireless communication, comprising:
- one or more memories; and
- one or more processors coupled to the one or more memories, the one or more processors configured to:
  - receive a radio resource control (RRC) message that includes at least one dedicated table bit that indicates a modulation and coding scheme (MCS) table of a set of MCS tables and indicates whether the UE is to use, to decode downlink traffic, a first modulation order and a first target code rate corresponding to a first MCS table of the set of MCS tables or a second modulation order and a second target code rate corresponding to a second MCS table of the set of MCS tables, and wherein the second MCS table corresponds to 1024 quadrature amplitude modulation (QAM), and wherein the MCS table is the first MCS table or the second MCS table;
  - receive a downlink control information (DCI) transmission comprising a DCI format;
  - select, based at least in part on at least one value of the at least one dedicated table bit in the RRC message and the DCI format, a modulation order and a target code rate corresponding to an MCS table of the set of MCS tables; and
  - decode the downlink traffic according to the selection of the modulation order and the target code rate.

30. A network entity for wireless communication, comprising:
- one or more memories; and
- one or more processors coupled to the one or more memories, the one or more processors configured to:
  - transmit, to a user equipment (UE), a radio resource control (RRC) message that includes at least one dedicated table bit that indicates a modulation and coding scheme (MCS) table of a set of MCS tables and indicates whether the UE is to use, to decode downlink traffic, a first modulation order and a first target code rate corresponding to a first MCS table of the set of MCS tables or a second modulation order and a second target code rate corresponding to a second MCS table of the set of MCS tables, and wherein the second MCS table corresponds to 1024 quadrature amplitude modulation (QAM), and wherein the MCS table is the first MCS table or the second MCS table;
  - transmit a downlink control information (DCI) transmission comprising a DCI format;
  - select, based at least in part on at least one value of the at least one dedicated table bit in the RRC message and the DCI format, a modulation order and a target code rate corresponding to an MCS table of the set of MCS tables; and
  - transmit the downlink traffic according to the selection of the modulation order and the target code rate.

* * * * *